(12) United States Patent
Stiehl et al.

(10) Patent No.: US 7,523,761 B2
(45) Date of Patent: Apr. 28, 2009

(54) DEVICE FOR CONTROLLING FLUID FLOW FROM A TANK

(75) Inventors: Oliver Stiehl, Wiesbaden (DE); Thomas Heep, Hadamar-Steinbach (DE); Jörg-Michael Steinhardt, Taunusstein (DE)

(73) Assignee: Steinhardt GmbH (DE)

( * ) Notice: Subject to any disclaimer, the term of this patent is extended or adjusted under 35 U.S.C. 154(b) by 304 days.

(21) Appl. No.: 11/296,684

(22) Filed: Dec. 7, 2005

(65) Prior Publication Data

US 2006/0157114 A1    Jul. 20, 2006

(30) Foreign Application Priority Data

Dec. 8, 2004    (EP)    ................... 04029033

(51) Int. Cl.
*F16K 31/20*    (2006.01)

(52) U.S. Cl. ................ 137/398; 137/403; 74/25

(58) Field of Classification Search ............... 137/398, 137/403, 899; 251/294; 74/25, 56
See application file for complete search history.

(56) References Cited

U.S. PATENT DOCUMENTS

| | | | | |
|---|---|---|---|---|
| 1,250,474 | A * | 12/1917 | Lee | 74/25 |
| 1,799,849 | A * | 4/1931 | Hardacker et al. | 137/885 |
| 1,888,612 | A * | 11/1932 | Anderson | 74/89.22 |
| 1,991,081 | A * | 2/1935 | Charpier | 137/412 |
| 2,116,422 | A * | 5/1938 | Anderson | 137/398 |
| 2,207,921 | A * | 7/1940 | Huxford | 251/294 |
| 2,242,303 | A * | 5/1941 | Irmischer | 74/526 |
| 2,300,856 | A * | 11/1942 | Anderson | 137/398 |
| 2,549,204 | A * | 4/1951 | Kaddatz | 137/412 |
| 2,660,065 | A * | 11/1953 | Williams | 74/25 |
| 3,025,872 | A * | 3/1962 | McLerran et al. | 137/398 |

(Continued)

FOREIGN PATENT DOCUMENTS

DE    3240902 A1    5/1984

(Continued)

*Primary Examiner*—John Rivell
*Assistant Examiner*—Craig Price
(74) *Attorney, Agent, or Firm*—Price, Heneveld, Cooper, DeWitt & Litton, LLP (57) ABSTRACT

The device for controlling fluid flow from a rain retention chamber or the like includes an inlet communicating with the chamber, an outlet permitting fluid to flow out of the device, and a shutter disposed between the inlet and the outlet, and supported in the device for linear shifting between a raised position and lowered position. A control element is rotatably mounted in a device for rotation about a central axis and includes a curved controller surface which is non-concentric with the central axis of the central element, such that rotation of the control element varies the radial distance between the central axis and the controller surface. A coupler member operably connects the shutter with the controller surface, such that rotation of the control element shifts the shutter between the raised and lowered positions to achieve a predetermined flow rate of fluid from the chamber. The device also includes a sensor adapted to detect fluid level in the chamber, and includes an actuator which shifts linearly as a function of the fluid level in the chamber. A transmission member operably connects the actuator with the control element, such that linear shifting of the actuator in response to fluid level fluctuations in the chamber rotates the control element to selectively shift the shutter in a direction which achieves the predetermined flow rate.

33 Claims, 10 Drawing Sheets

U.S. PATENT DOCUMENTS

| | | | | |
|---|---|---|---|---|
| 4,261,332 A | * | 4/1981 | Stewart | 137/861 |
| 4,582,083 A | * | 4/1986 | Steinhardt | 251/294 |
| 4,702,271 A | * | 10/1987 | Giehl | 137/389 |
| 4,726,240 A | * | 2/1988 | Brems | 74/25 |
| 4,800,917 A | * | 1/1989 | DePirro | 251/329 |
| 5,321,988 A | * | 6/1994 | Folino | 74/25 |
| 5,678,802 A | * | 10/1997 | Lunder | 251/294 |
| 5,887,613 A | * | 3/1999 | Steinhardt | 137/395 |

FOREIGN PATENT DOCUMENTS

| | | |
|---|---|---|
| DE | 3418348 A1 | 11/1985 |
| DE | 3822555 A1 | 8/1989 |
| DE | 3921766 A1 | 1/1991 |
| DE | 29920430 U1 | 3/2000 |
| FR | 2675562 A1 | 10/1992 |

\* cited by examiner

DEVICE FOR CONTROLLING FLUID FLOW FROM A TANK

CLAIM OF PRIORITY

Applicants hereby claim the priority benefits under the provisions of 35 U.S.C. § 119, basing said claim of priority on European Patent Application Serial No. 04 029 033.0, filed Dec. 8, 2004. In accordance with the provisions of 35 U.S.C. § 119 and Rule 55(b), a certified copy of the above-listed European patent application will be filed before grant of a patent.

BACKGROUND OF THE INVENTION

The invention relates to a device for controlling outflow from a tank, especially a rain-retaining chamber or the like with an outlet opening for the liquid, and is particular to a device wherein the outlet opening is assigned a shutter that can be moved in a straight line to control the outflow of the liquid from the container as a function of the liquid level in the tank.

In rain retention chambers and other storage chambers, the outflowing water quantity is generally controlled by changing the cross section area of the outlet opening. However, the shuttering cannot be controlled directly proportionally to the water level; rather it must be controlled in the direction of a slower shuttering with increasing backwater height.

Numerous variations of such devices to control the constant outflow from a tank are known from the state of the art. They usually use a float, i.e., a component whose position can be changed depending on the liquid level in the tank. By way of a rod or the like, the float actuates the shutter, which has the function of a gate or throttle element.

A device such as this is known from DE 32 40 902 A1. In it, the shutter is guided in a vertical direction in front of and over the outlet opening. The float is mounted so that it can swivel around a stationary horizontal axis by way of a float rod. A control disk with a curve located on its circumference is connected so that it rotates mutually with the float rod, in the area of its swivel bearing. An angle of a guide rod that holds the shutter rides on the curve. The stroke of the guide rod is thus regulated using the control disk driven by the float. In the case where high water levels have to be managed, providing a control with several independent floats is suggested, which interact with control disks arranged over each other. In this case, the guide rod is elongated accordingly and has a curve rider at the height of the control curve of each control disk. A device such as this has a very complicated construction. Besides that, it does not allow an exact control of the constant outflow with substantial backwater heights. In addition, such devices cannot be built in compact form because of the float construction.

EP 0 707 254 A2 describes a device of the type discussed above, in which the shutter is controlled by way of a curve by a component whose position can change depending on liquid pressure. In this case, a boot is provided that is mounted in the area of one of its ends and the other end of which holds a plate-shaped control element that is provided with a curve, whereby this curve is formed by a flank of a control slot of the control element. The shutter is mounted so that it is guided vertically, whereby a horizontal pin connected with the shutter engages in the control slot. A horizontal driving movement of the control element during expansion and/or contraction of the boot leads to a vertical movement of the shutter in opposite directions. What is especially disadvantageous in such devices is that the horizontal displacement of the control element that is linked with the displacement of the boot does not allow precise regulation of a constant flow. This is especially true because the curve has a control length that is too short.

SUMMARY OF THE INVENTION

One objective of the present invention is to further develop a device of the type described above in such a way that has an uncomplicated and compact construction, and ensures a precise control of a constant outflow from the tank, even with substantial backwater heights.

The objective is achieved with a device of the type described above, in that a control element that rotates around an axis has a curve, whereby the curve is used to convert the rotary movement of the control element into the translational movement of the shutter or gate.

The device according to the present invention is preferably used in constructions with floats or pressure regulators, especially with pressure regulators.

The rotating control element has a curve that can be designed in many different ways. In a preferred embodiment, it is provided that the control element is designed as a disk with a curve arranged in a spiral shape with respect to the disk axis of rotation. In this way, the control element can be represented by a simple, flat, plate-shaped element. The curve can be integrated into the disk especially easily in that the disk is provided with a surrounding slot or a surrounding groove, while the flank of the slot and/or of the groove forms the curve. Alternatively, the control element is designed as a rotation-symmetrical element with a curve arranged on the radial circumference and extending in the radial and axial directions of the element. During design of the control element as a rotation-symmetrical element, it is considered especially advantageous if it has a surrounding groove and the curve forms a flank of the groove. Alternatively, the control element is designed as a rotation-symmetrical element with a curve that is arranged on the radial circumference and extends in the radial and axial directions of the element. With the design of the control element as a rotation-symmetrical element, it is considered especially advantageous if it has a surrounding groove and one flank of the groove forms the curve.

In the device according to the present invention, a control element that rotates around an axis and has a curve is used. This curve is integrated in the control element, and makes it possible to produce the detailed control of the constant flow out of the tank using an optionally long length of the curve. This means it is considered especially advantageous if the curve extends over an angle of at least 360 degrees, and especially 360 degrees to 460 degrees, relative to the control element axis.

The curve associated with the rotating control element makes it possible to produce travel distances of the shutter in the range of tenths of a millimeter. When using large travel distances of the curve, which extend over an angle of rotation of 460 degrees or the like, substantial backwater heights can be accommodated. The control is carried out using the control curve with a low force requirement. The design of the curvature of the curve results from the physical conditions of the application.

The curve is preferably designed in such a way that a conversion from the travel distance of the float or pressure regulator to the proportional path of the curve occurs, and namely in the hundredths millimeter range. In this way, regulation of significant backwater heights can be achieved for the first time using the path length of the curve that is now possible. Because of the special form of the curve, especially the snail form or the thread form, the force on the control roller that cooperates with the curve and/or the flank of the groove/slot is significantly decreased, and as a result, it is possible to design the construction so that it is compact and keeps the mechanical friction very low.

Because of this effect, the design layout of the device can be simplified. Because of the force curve, it is possible for the first time to use float techniques that are connected directly to the curve without a lever arm. Because of the special form of the control curve, a method is possible that ensures implementing a control curve diagram that can traverse the entire parameter of the required backwater heights. This is achieved by the large range of rotation, e.g., of 460 degrees of the curve. This type of process in a vertical regulator curve is impossible, since in that case, a range of rotation is only available that extends over a significantly smaller angle section, and thus, the associated diagram would have the same traveling distances as the curve according to the invention, which cannot be realized mechanically.

Because of the very great curve length, the regulator can be operated with very high precision. In the individual control positions, the shutter has low tolerance in its travel and thus low specified value deviations. Because of the good traversable radius of the curve, special requirements can also be implemented, e.g., especially significant backwater heights.

In combination with a vertical float arrangement, it is possible to achieve a maximum backwater goal with the curve without confronting a restriction due to the twisting area. This is due to the fact that the float rises proportionally with the water level, and is continuously controlled by the water pressure with the opening of the controller by way of the shutter. Alternatively, the curve can be operated without any problems by using a pressure sensor.

In the device, the shutter is especially guided so that it can be moved vertically. It thus lies under its own inherent weight, against the curve by means of a coupling element connected with the shutter, and is more or less raised or lowered, according to the respective position of rotation of the control element, and thus relatively modified position of the curve. A lower control edge of the shutter is advantageously designed so that it is essentially straight and arranged horizontally. It is completely conceivable to provide the lower control edge with a curvature that more or less extends into the cross section of the outlet opening, according to predetermined, desired shutter relationships.

As already indicated above, the invention makes it possible in an especially advantageous type and manner to control the shutter using the curve by means of a device that shifts depending on the liquid pressure. This device especially has the component that can be driven with translational movement, thus changing its position, which converts the actuating movement into the rotary movement of the control element by way of transfer means. These transfer means can be designed in many different ways, for example as a cable, gear wheels that engage with each other, pulley wheels, etc. Because of the arrangement of the gears or pulley wheels, the transmission ratio and the force can be changed in an especially simple way. This is seen as especially advantageous if the transmission means are designed as an enclosed reversing cable drive, wherein the actuator is connected with one cable section of the cable drive, and the control element is connected to a rotating reversing roller for the cable drive. Because of this, a transmission of the actuator movement to the deflection roller is possible in a very simple construction design.

It is considered especially advantageous if a counterweight acts on the shutter with a direction of action in the opening direction of the shutter. This ensures that the shutter acts together with the curve of the control element in a relatively weight-neutral manner. This means that friction influences are largely negligible.

The element that changes shape or shifts depending on liquid pressure is especially designed as a hydrostatic converter with a roller membrane. The hydrostatic converter especially has a cylinder and in it, a piston that is guided and sealed with respect to the roller membrane. In the cylinder, preferably spring means are mounted that act in a direction opposite to the direction of action of the piston for sliding the shutter into its shuttering direction onto the piston. If the hydrostatic pressure registered by the component that changes shape drops again, the spring means cause the movement of the piston in the opening direction of the shutter. Since the spring rate generally changes with the backwater height, the spring rate of the spring means is preferably coordinated to the maximum backwater height of the device.

An especially precise regulation can be achieved with the element that changes shape if it has an inlet opening on the underside for the hydrostatic pressure. Thus the controlling process starts even with a very low banking of liquid in the tank.

The cylinder chamber of the device that shifts as a function of the liquid pressure is preferably provided with an access for an external air line. This makes it possible, during routing of the outlet opening, to externally apply an elevated air pressure on the cylinder chamber assigned to the air line with the consequence that the shutter is moved into the position in which it completely releases the outlet opening so that the displacement due to floating away can be eliminated.

The elimination of displacement can also occur in that the device is arranged in a bulkhead reservoir that is provided with an inlet opening for the liquid and an outlet opening for the liquid, whereby the shutter is assigned to the outlet opening and another shutter is assigned to the inlet opening, and the component that changes position actuates both shutters. It is especially conceivable that this other shutter is movable basically as described above regarding the invention and also is actuated in this sense. If the inlet opening is displaced, the liquid level in the bulkhead reservoir drops and thus the static pressure does. As a consequence, the component that changes position actuates both shutters in the sense of an opening movement, whereby the displacement is eliminated.

With the device according to the present invention, it is possible to ensure, in a simple way, a constant outflow from the head water, even if there is banking in the tail water. In this case, another hydrostatic converter is mounted on the tail water side that is controlled depending on the liquid pressure of the tail water, whereby the external air line of the converter on the head water side is connected to the cylinder chamber of the converter on the tail water side that is turned away from the cylinder chamber of the tail water side converter that has an inlet opening for the hydrostatic pressure of the tail water. During normal operation, i.e., no backpressure, the liquid in the tail water can flow unimpeded through the defined control opening. The actuation of the shutter is carried out by the hydraulic converter in the head water side. Since there is no backpressure, the hydraulic converter on the tail water side detects no pressure increase. The consequence of the opposing pressure in the head water created with backpressure is that the required constant flow of the head water from the tank is reduced with the control opening in a normal setting. By means of the hydrostatic converter installed in the tail water, which now detects the elevated pressure in the tail water, the hydrostatic converter installed in the head water experiences a reversing function, so that the constant outflow can be maintained.

The option exists of designing the device with a very compact construction, especially if a pressure regulator is used in the device, and thus no float control has to be provided. This makes it possible to mount the device in a frame. Therefore, the device can be mounted in advance at a location outside the tank, and the option exists of then placing all of it, arranged on the frame, into the desired area of the tank.

Other characteristics of the invention are explained in the claims, the description of the figures and the figures themselves, whereby it is noted that all the individual characteristics and all combinations of individual characteristics represent other designs according to the invention.

Several example embodiments will be explained in more detail with reference to the drawings. The following are shown.

DETAILED DESCRIPTION OF THE PREFERRED EMBODIMENTS

Figure 1:
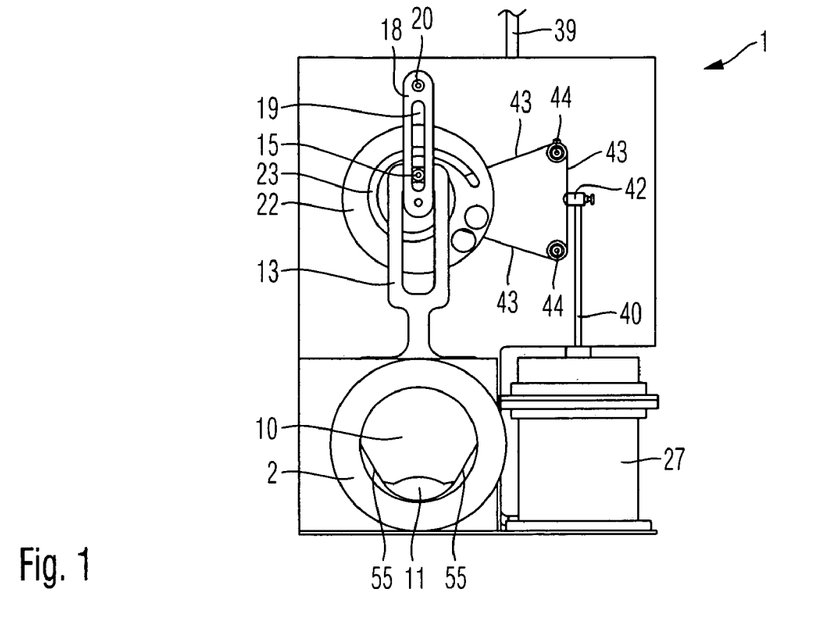
FIG. 1 shows a front view of a first embodiment of the device according to the invention.
Figure 2:
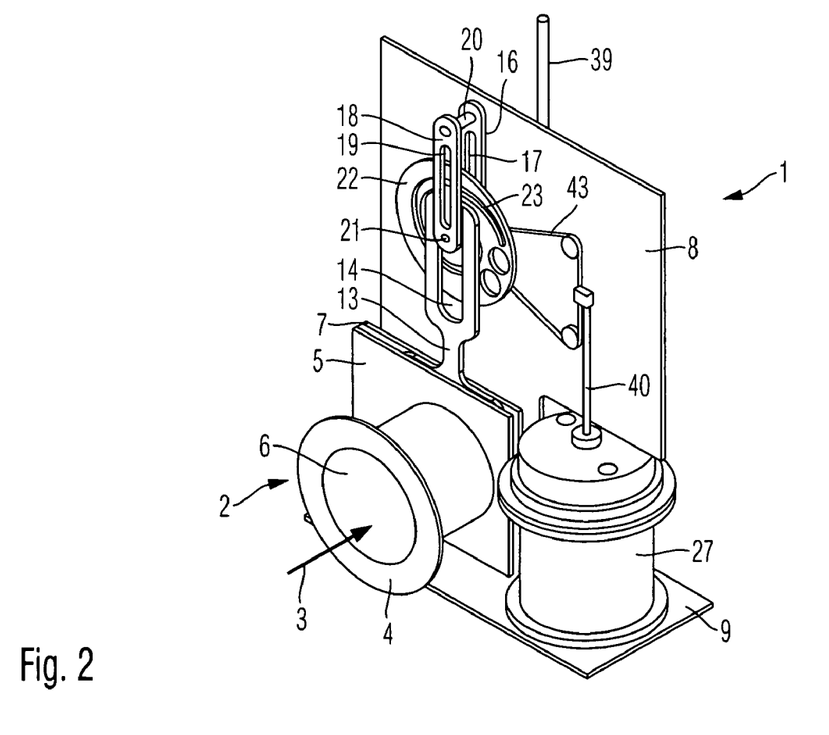
FIG. 2 shows a three-dimensional view of the device shown in FIG. 1, diagonally from the front and top.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
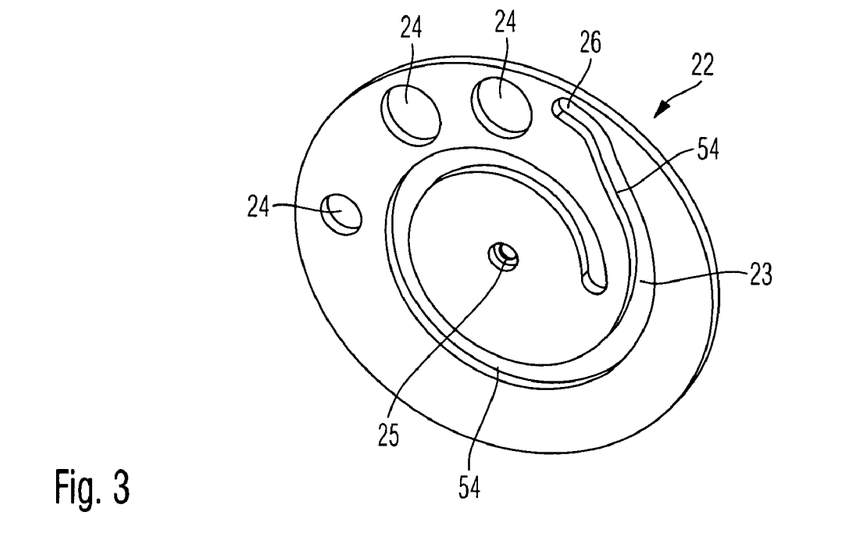
FIG. 3 shows a three-dimensional view of the disk that is used as a control element in the embodiment according to FIGS. 1 and 2.

For the first embodiment according to FIGS. 1 to 3, the important components are shown that form the device 1 for controlling the constant outflow from a tank, especially a rain-retaining chamber. The rain-retaining chamber itself is not shown, but only one flange pipe 2 of it, through which the liquid escapes in the direction of arrow 3 when leaving the tank. The liquid pipe 2 is embedded in a wall of the tank that is not shown, and is located in the area of the base of the tank. A plate 5 that is provided with a circular opening, the diameter of which corresponds to the opening diameter 6 of the flange pipe 2, and is welded to the end of the flange pipe 2 turned away from the actual flange ring 4 of flange pipe 2. The flange pipe 2 and the plate 5 form an assembly parallel to the plate 5, and at a small distance from it, another plate 7 that is dimensioned corresponding to the plate 5 is positioned, and thus has a corresponding opening. This plate 7 is welded together with a larger bearing plate 8, which is positioned vertically just like plates 5 and 7 and is welded together with a horizontal lower base plate 9. The bearing plate 8 is provided with an opening that matches the openings in plates 5 and 7. Escaping liquid thus goes out of the tank through the flange pipe 2 and the openings in the two plates 5 and 7, as well as the opening in the bearing plate 8.

The slot space between the two plates 5 and 7 is used to hold a plate-shaped gate or shutter 10. This is shown with a "V" shape at the bottom, for example as in FIG. 1. The control opening of the device 1 is indicated with the reference number 11. In the completely lowered position of shutter 10, as shown in FIGS. 1 and 2, only a small passage cross section for the liquid is formed between the V-shaped legs of shutter 10. In a completely raised position, the shutter 10 largely releases the opening diameter 6, which results in a large control opening 11.

The two plates 5 and 7 are thus used for guiding the shutter 10 in outflow direction of the liquid. Lateral guides 12, as are shown for the other embodiment according to FIGS. 4 and 5, guide the shutter 10 vertically at both sides.

These two guides are fastened to plate 7 and arranged parallel to each other.

The shutter 10 can thus be driven in a straight line and vertically. In the area of its upper end, the shutter 10 is connected centrally with a suspension 13. It is also designed so that it is plate-shaped and has an elongate passage slot 14 that runs vertically. In the area of its upper end turned away from the shutter 10, the suspension 13 holds a horizontally oriented pin 15.

With the bearing plate 8 above the opening for liquid escape, a vertically oriented strip 16 is connected that is likewise provided with a vertically oriented through slot 17. A corresponding strip 18 with through slot 19 is connected with strip 13 by means of a spacer bolt 20 in the area of its upper end. A spacer bolt 21 connects the two strips 16 and 18 in the area of its lower end. Starting through the strip 18, spacer bolt 21 first passes through the through slot 14 of the suspension 13, and then a bearing hole 25 of a control element disk 22 that can rotate freely with respect to the spacer bolt 21. The control element disk 22 is designed as a circular disk. With respect to its axis of rotation through the spacer bolt 21, control element disk 22 has a spiral-shaped through slot 23 which extends over a circular angle of about 460 degrees, thus clearly over more than a full circle. Pin 15, which is connected to the free upper end of the suspension 13, extends through slot 17 of the strip 16 and the through hole 19 of the strip 18, as well as the through slot 23 of control element disks 22. Rotation of the control element disk 22 around the axis of the spacer bolt 21 thus leads to the fact that the shutter 10 is lifted or lowered more or less, depending on the slope of the worm formed by the shape of the non-concentric through slot 23 and the rotational direction of the control element disk 22. The large rotational range of the control element disk 22, as can especially be seen from the illustration of the control element disk 22 according to FIG. 3, makes possible the precise movement of the shutter 10 over the angular sections specified by the illustrated predetermined swivel range of around 460 degrees. The shape of the through or passage slot 23 can be designed individually according to the special requirements of a particular application to achieve constant outflow, as can be seen from one end area of the through slot 23 according to the illustration in FIG. 13. The circular holes 24 arranged in the outer area of the control element disk 22 are provided exclusively for weight-saving reasons.

It can be seen from the illustration in FIG. 3, that starting at a defined distance from the hole 25 to one of the two ends of the through slot 23, the through slot 23 is continuously further from the hole 25, whereby upon reaching a spiral angle of around 360 degrees, the subsequent section of the through slot 23 is further from hole 25, so that this section has a greater slope away from the center of the control element disk 22. In the area of the other end, the through slot 23 has a section 26 that is almost tangential. If the pin 15 in the area of section 26 extends into the through slot 23, the shutter 10 is in its maximally lowered position. Opposed flanks 54 of the through slot 23 form the curve.

In the following, the drive for the control element disk 22 is described.

In addition to the two plates 5 and 7, the bearing plate 8 has a recess in the area of which a hydrostatic converter 27 is mounted. This thus has the function of an element that changes shape or shifts depending on the liquid pressure in the tank. The converter 27 and/or pressure sensor has a cylinder 28 and a sealed piston 29 that is guided in it. A roller membrane 30 is assigned to it. As a consequence, the converter 27 is divided into an upper cylinder chamber 31 and a lower cylinder chamber 32 by means of the piston 29 and/or the roller membrane 30. The upper cylinder chamber 31 is provided with two openings 34 in the area of its upper face wall 33 so that the liquid of the tank located in the upper cylinder chamber 30 acts with hydrostatic pressure on roller membrane 30.

In the lower cylinder chamber 32, several coil springs 35 are arranged that support themselves on a lower face wall 36 and the piston 29. The ends of springs 35 are guided in pipe sockets 37, which are connected with the face wall 33 and/or the piston 29. The lower cylinder chamber 32 is closed; it has only one lateral opening 38, in the area of which a conduit or line 39 is connected laterally through the cylinder 28. This line is an air line; it lies at atmospheric pressure or can be pressurized by pressure from an outside source.

In piston 29, a piston rod 40 is mounted centrally and tightly connected with it. The piston rod 40 extends partially into the lower cylinder chamber 32 and passes through the upper cylinder chamber 31. It extends through an opening in the face wall 33 and is guided upward. A stop 41, that is mounted outside the converter 27, connected with the piston rod 40 and adjustable on it, is used for limiting the movement of the piston rod 40 when the piston 29 is driven in.

As can be seen in the illustration in FIGS. 1 and 2, the hydrostatic converter 27 is placed in the area of its face wall 36 on the base plate 9 and fastened to it. The piston rod 40 is positioned at a slight distance, parallel to the bearing plate 8 and extends vertically to the free upper end of the piston rod 40 connected to a belt 43, especially a toothed belt, by a clamp 42. This forms a transmission that converts the translational or vertically linear movement of the piston rod 40 into the rotary movement of the control element disk 22. This transmission is designed as an enclosed, reversing cable drive in the manner of a belt. The belt 43 is guided around two rollers 44 that rotate around two horizontal axes that are arranged so that they match vertically, and are mounted in the bearing plate 8. From this, the belt 43 is guided around the roller that is not shown in more detail, but is likewise designed as a gear wheel that is arranged concentrically to hole 25 connected to the control element disk 22.

Figure 4:
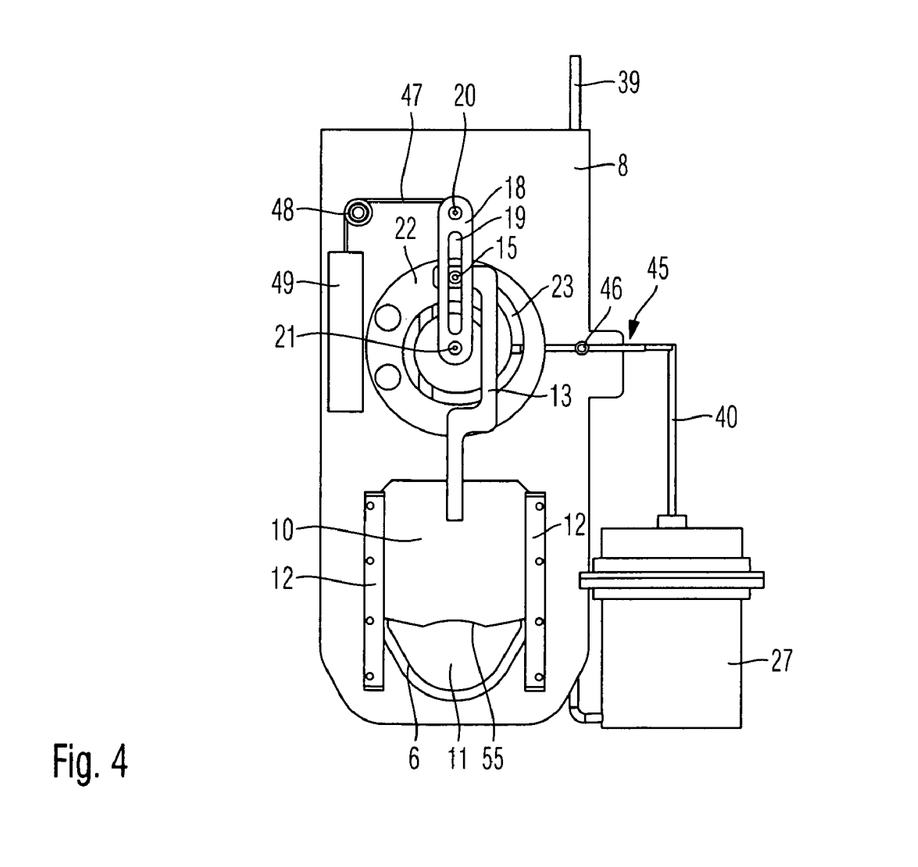
FIG. 4 shows an embodiment modified slightly in comparison to the embodiment according to FIG. 1, in a front view.
Figure 5:
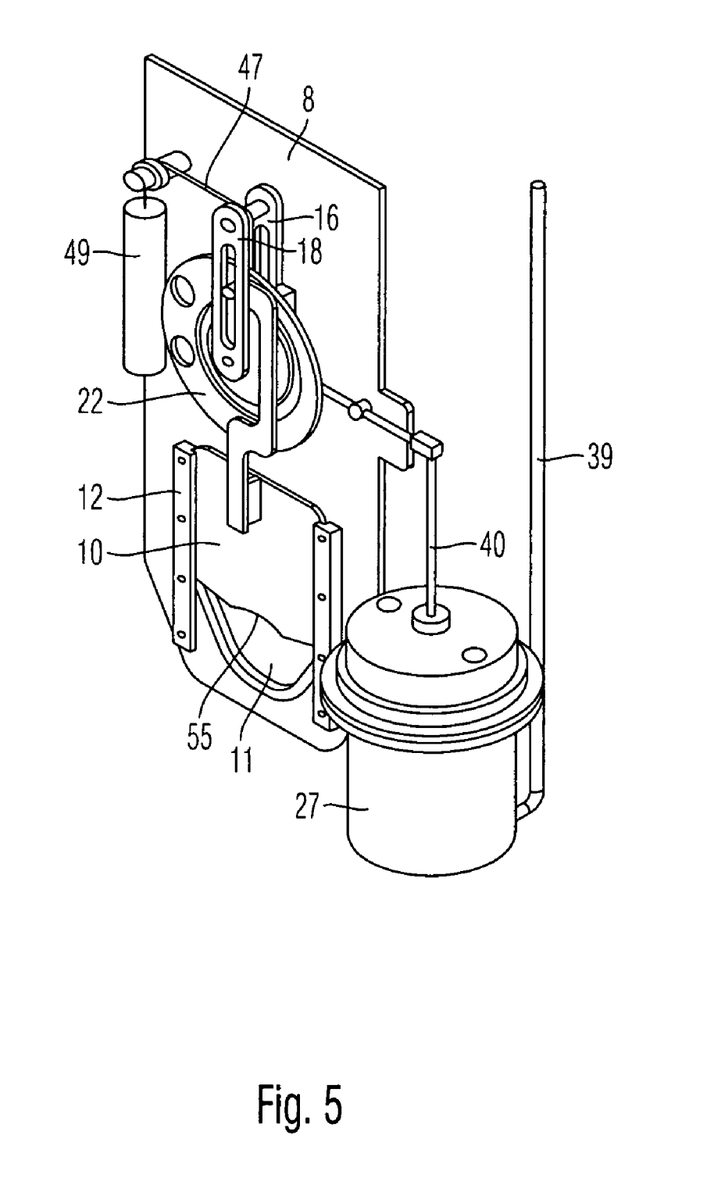
FIG. 5 shows a view of the embodiment according to FIG. 4, diagonally from the front and top.

While the embodiment according to FIGS. 1 and 2 shows the shutter 10 in its completely lowered position, the other embodiment according to FIGS. 4 and 5 shows a modified device, in which the shutter 10 is located in its completely raised position. The structure of this device is basically the same as the one according to FIGS. 1 to 3 and 6, 7. Parts of the embodiment according to FIGS. 4 and 5, which correlate in function or structure to those of the other embodiment according to FIGS. 1 to 3, 6 and 7, are designated with the same reference numbers for the sake of simplicity. The deviations of the embodiment according to FIGS. 4 and 5 from the other embodiments are explained as follows.

The vertical movement of the piston rod 40 is transferred to the end of a double lever 45, which can be swiveled around an axis 46. The rotary bearing assigned to the axis is connected to the bearing plate 8. The end of the lever 45 disposed away from the piston rod 40 holds a rack (not shown) that can be swiveled, with play compensation in the longitudinal direction of the lever 45, which is mounted in bearing plate 8, so that it can be driven vertically. A gear (not shown) meshes with this rack, which is connected to it in a concentric relationship with the hole 25 of the control element disk 22. In this way, the translational movement of the piston rod 40 is transformed into the rotary movement of the control element disk 22. The suspension 13 is designed as a three-angled component, and therefore has no through slot 14, but only has the pin 15 that engages into the through slot 23 of the control element disk 22 in the end of the area of the end turned toward the shutter 10. A cable engages pin 15, which is deflected vertically first over the upper spacer bolt, and from there is guided horizontally to the side. The cable 47 is then deflected downward around a roller 48 that is mounted, so that it can turn around the bearing plate 8, and a weight 49 is supported at the end of the cable assigned to this area of the cable. The gravitational force of the weight 49 is selected so that it corresponds essentially to the total weight of shutter 10 and suspension 13, whereby these components are held quasi-weightlessly by the guides 12. Because of this, the shutter 10 can be raised and lowered with the smallest amount of force by turning the control element disk 22.

The control edge 55 of this shutter 10 is designed so it is essentially straight and mounted horizontally.

With the hydrostatic converter 27, the roller membrane 30 has the function of keeping the friction resistance between cylinder 28 and piston 29 as low as possible. The roller membrane 30 is connected on one side to the cylinder inner wall and on the other to the piston. During a movement of the piston 29 in the cylinder 28, the roller membrane 30 turns up more or less. It seals the area between the piston and cylinder reliably.

Figure 6:
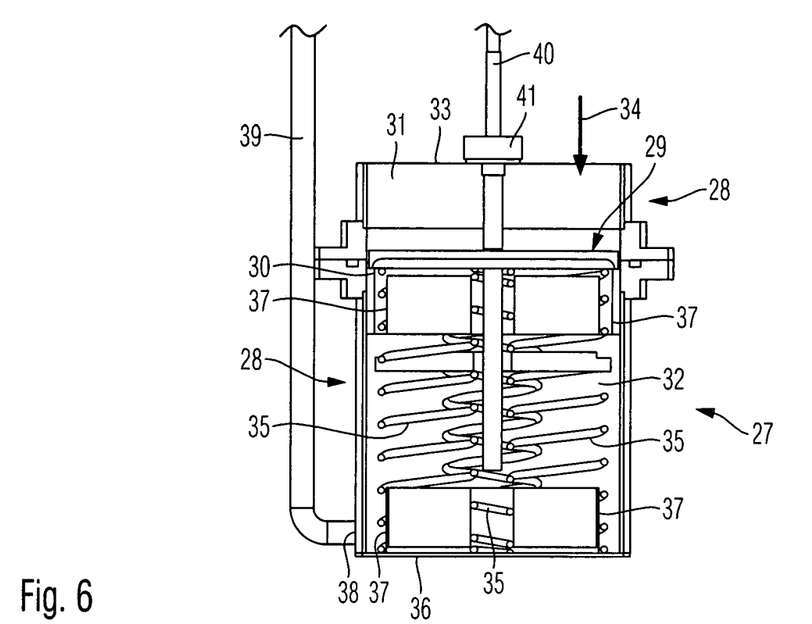
FIG. 6 shows a vertical cross section through the pressure regulator used in the embodiments according to FIGS. 1 to 5, which is designed as a hydrostatic converter with a roller membrane.
Figure 7:
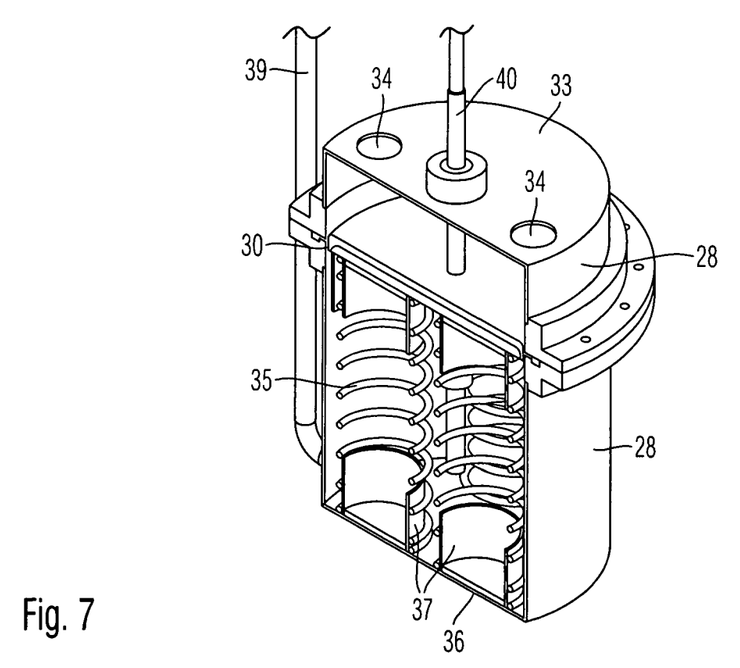
FIG. 7 shows a three-dimensional view of the pressure regulator shown in FIG. 6, diagonally from the front and top.
Figure 8:
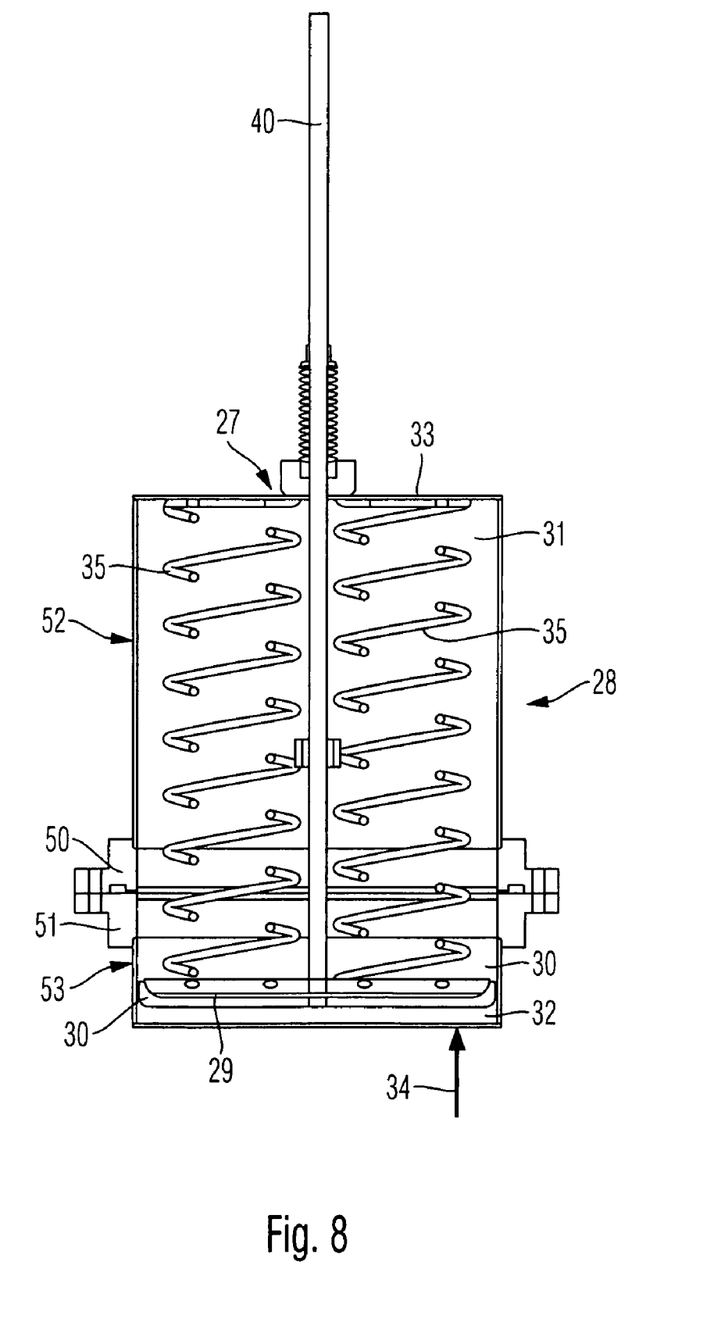
FIG. 8 shows an embodiment of a pressure regulator that is slightly modified in comparison to the embodiment according to FIGS. 6 and 7 in a vertical cross section.
Figure 9:
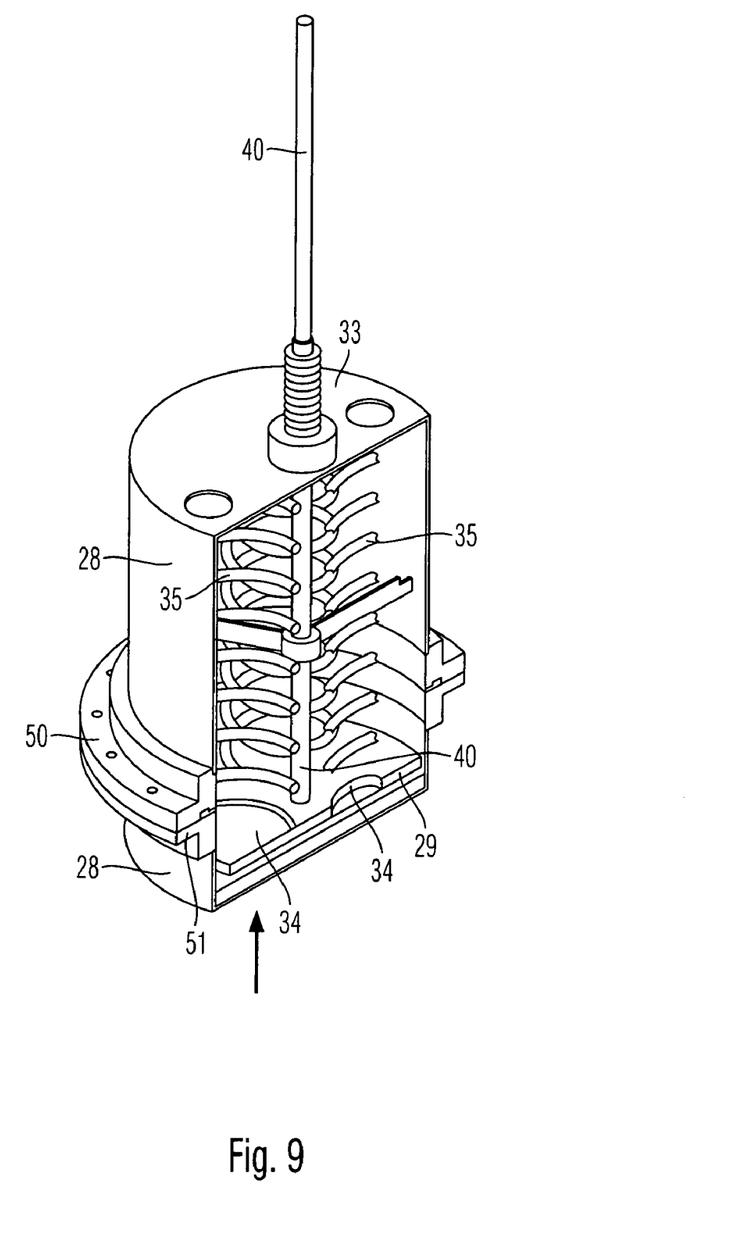
FIG. 9 shows the pressure regulator shown in FIG. 8 in a three-dimensional view, seen diagonally from the side and top.

FIGS. 8 and 9 show a modified design of the hydrostatic converter 27. Parts that correspond in structure or function to those according to the embodiment of the converter according to FIGS. 6 and 7 are indicated with the same reference numbers for the sake of simplicity. The deviations in the embodiment according to FIGS. 8 and 9 are as follows.

With the converter shown in FIGS. 8 and 9, the liquid entry into the converter occurs from below, thus through the openings 34 located in the area of the lower face wall 36. The converter 27 is shown in a non-pressurized position. The piston 29 is located close to the face wall 36. The roller membrane 30 is clamped with its area at a distance from the piston 29 between the two flanges 50 and 51 of cylinder parts 52 and 53. Several coil compression springs 35 are supported on piston 29 and the upper face wall 33. The line 39 that works together with the upper cylinder chamber 31 is not shown.

With a layout of outlet opening 6, whereby no possibility exists of transferring the shutter to the lowered position, the shutter can be lifted completely by pressurizing line 39 with compressed air by way of the converter 27 so the opening 6 is rinsed freely and then the device can work in standard operation after the compressed air is disconnected.

FIGS. 10 to 14 show a device for maintaining a constant outflow of the liquid from a hydraulic fixture 56 with head water 57 and tail water 58. The liquid levels of head water 57 and tail water 58 are indicated with the reference numbers 59 and 60, respectively. On the head water side, the hydraulic fixture 56 holds the device according to the invention as described according to FIGS. 1 to 9. The openings 34 of the hydrostatic converter 27 are arranged on its underside. The pressure inlet opening is designated with reference number 61. The transmission of the movement of piston rod 40 to the shutter 10 and/or its suspension 13 is not shown in more detail. Reference is made to the explanations above for this. On the tail water side, a corresponding hydrostatic converter 27 is arranged. In the sense of the explanation of the embodiment according to FIGS. 5 to 7, the conduit or line 39 connects the two hydrostatic converters 27. The pressure inlet opening of the hydrostatic converter 27 on the tail water side is also indicated with reference number 61.

Figure 10:
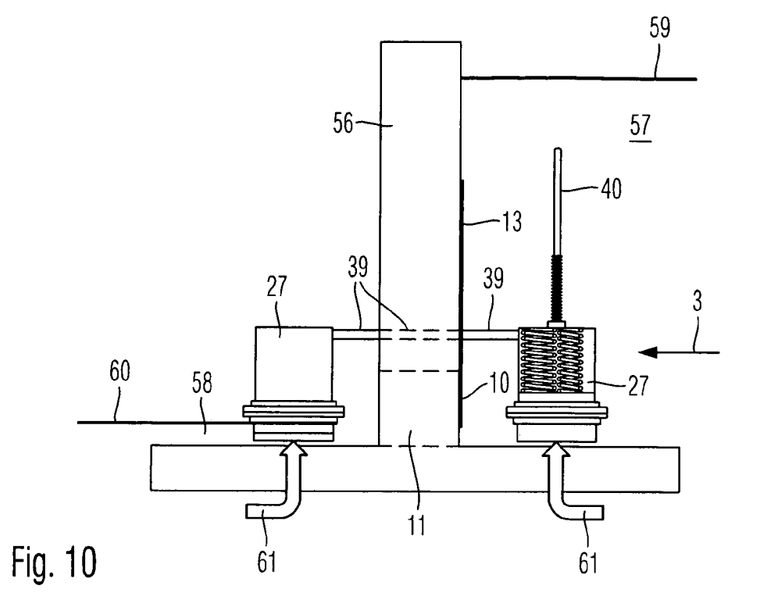
FIGS. 10 to 12 show different illustrations of an arrangement that comprises the device according to the invention and is used for backpressure recognition, shown in the normal operating situation.
Figure 11:
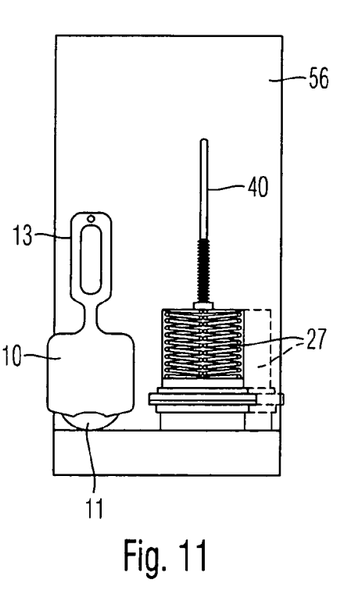
Figure 12:
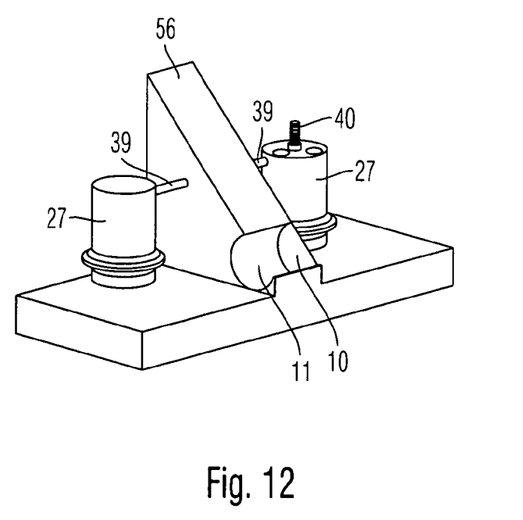
Figure 13:
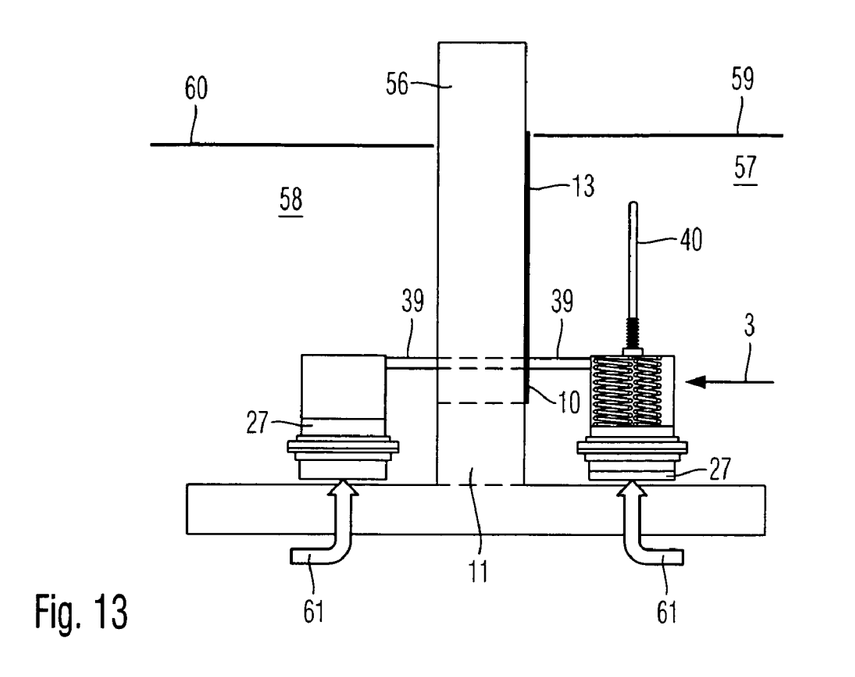
FIGS. 13 and 14 show the arrangement shown in FIGS. 10 to 12 for the backpressure situation.
Figure 14:
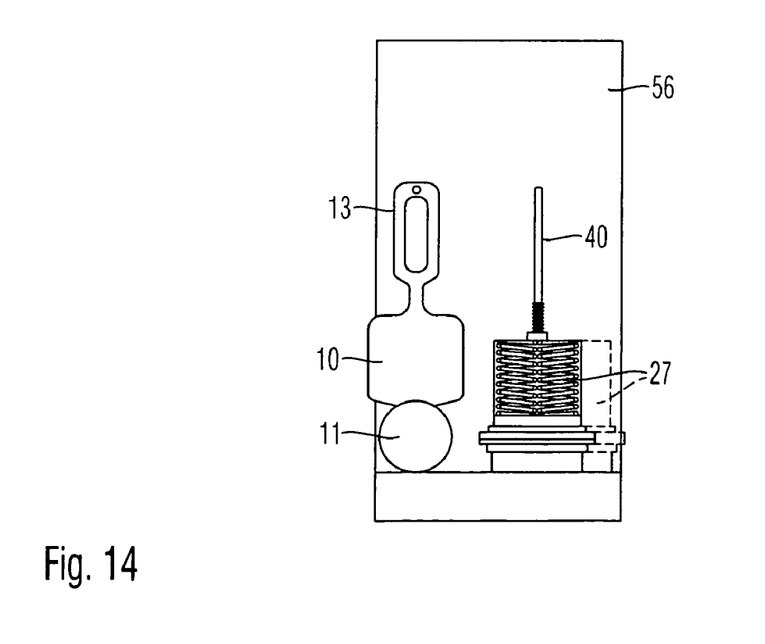

FIGS. 10 to 12 show the normal operation situation. From the head water, the liquid flows into the tail water so that liquid levels 59 and 60 occur. The tail water side converter 27 detects no elevated pressure. As a result, the shutter 10 is in the control position, and the constant liquid quantity per time unit $Q_{ab}$ can flow unhindered through the defined control opening, as can be seen from the illustration in FIG. 11. The backpressure situation is shown in FIGS. 13 and 14. The liquid level 60 in the tail water 58 increased by the backpressure causes an elevated pressure increase of the line 39 because of the activation of the hydrostatic converter 27 of the tail water. Because the pressure sensor/hydrostatic converter is installed in tail water 58, and the pressure sensor/hydrostatic converter 27 is installed in head water 57, the system experiences a reversing function, so that $Q_{ab}$ can be held constant.

Figure 15:
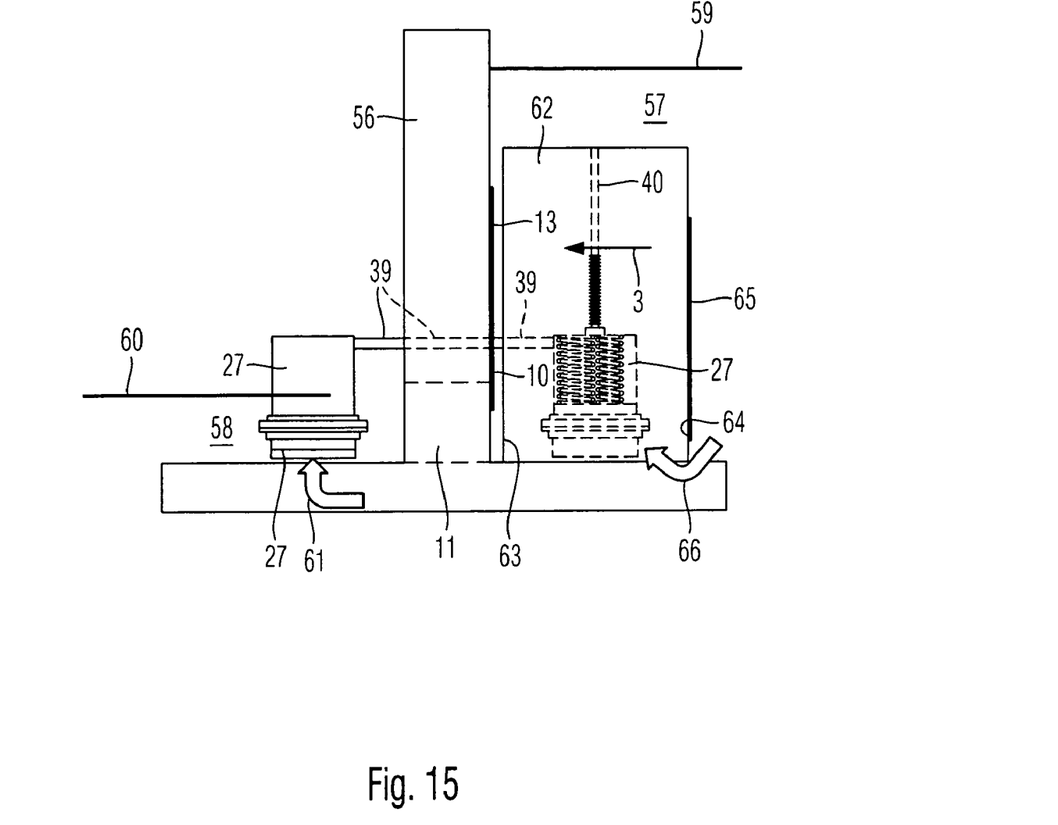
FIGS. 15 and 16 show a device in which the device according to the invention is used to eliminate displacement.
Figure 16:
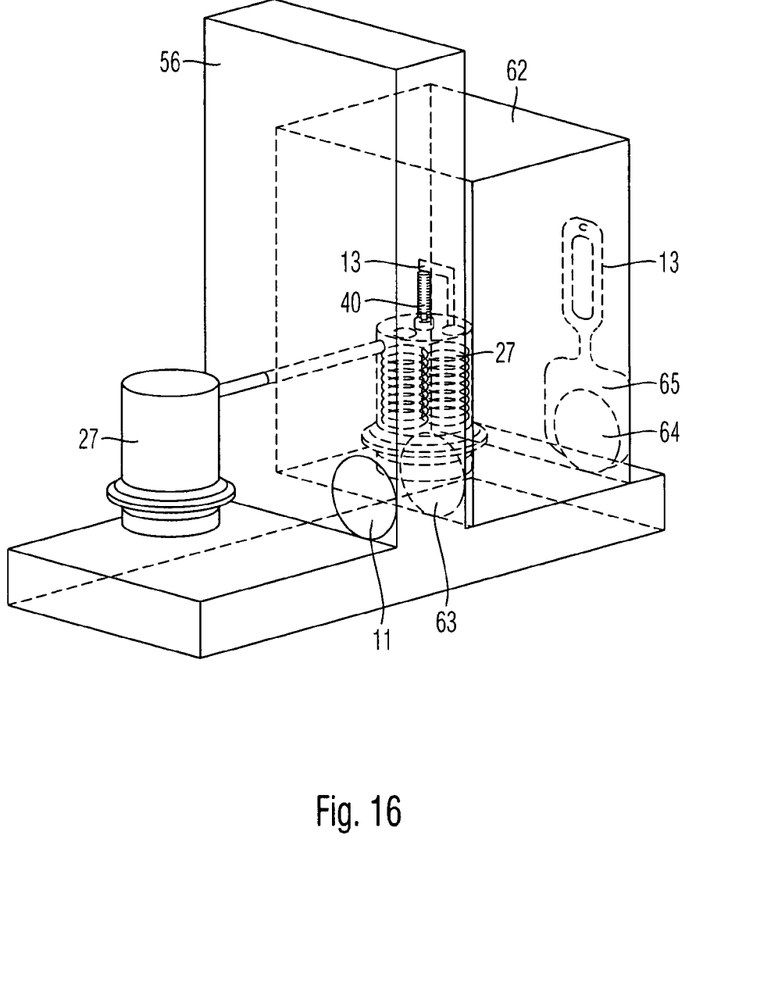

FIGS. 15 and 16 show a device that is expanded beyond the one according to FIGS. 10 to 14 in that an elimination of displacement is additionally possible with it. In contrast to the embodiment according to FIGS. 10 to 14, in the embodiment according to FIGS. 15 and 16, the hydrostatic converter 27 assigned to the head water 57 is mounted in a bulkhead reservoir 62 that has the function of a controller housing. This bulkhead reservoir 62 is provided with outflow opening 63 that corresponds to the control opening 11 and additionally an inlet opening 64 that is arranged on the side of the bulkhead reservoir 62 oriented away from the outlet opening 63 and is designed according to outlet opening 63. The outlet opening 63 is assigned to the shutter 10 described in the device according to the invention. Another shutter 65 is assigned to the inlet opening 64 that is guided and controlled according to shutter 10. Shutters 10 and 65 are actuated by a hydrostatic converter 27 mounted inside the bulkhead reservoir 62 in the manner described in the device according to the invention, but controlled independently. For the sake of simplicity, only the piston rod 40 that is assigned to the hydrostatic converter 27 and the suspension 13 of the respective shutters 10 and/or 65 are shown.

If the access 66 to the bulkhead reservoir 62, and thus the inlet opening 64, is displaced partially or completely, this leads to the fact that the liquid level 59 drops in the bulkhead reservoir. The hydrostatic converter 27 mounted inside the bulkhead reservoir 62 detects the pressure drop involved with this and controls the two shutters 10 and 65 in the sense of an opening movement. Because of the enlarged control cross section of the inlet opening 64, the displacement is eliminated and the device is regulated into normal operation.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A device for controlling fluid flow from a rain retention chamber, comprising:
   an inlet configured to communicate with the chamber to permit fluid in the chamber to flow into said device;
   an outlet configured to permit fluid from said inlet to flow out of said device;
   a shutter disposed between said inlet and said outlet, and supported in said device for linear shifting between a raised position, and a lowered position;
   a control element rotatably mounted in said device for rotation about a central axis, and including a curved, rotating controller surface which is non-concentric with said central axis of said control element, such that rotation of said control element and said rotating controller surface about said central axis varies the radial distance between said central axis and said rotating controller surface as measured along an associated radially extending reference line extending therebetween;
   a coupler member operably connecting said shutter with said rotating controller surface, such that rotation of said control element and said rotating controller surface about said central axis shifts said shutter between said raised and lowered positions to achieve a predetermined flow rate of fluid from the chamber;
   a sensor adapted to detect fluid level in the chamber, and including an actuator which shifts as a function of the fluid level in the chamber; and
   a transmission member operably connecting said actuator with said control element, whereby linear shifting of said actuator in response to fluid level fluctuations in the chamber rotates said control element and said rotating controller surface about said central axis to selectively shift said shutter in a direction which achieves said predetermined flow rate.

2. A device as set forth in claim 1, wherein:
   said curved rotating controller surface extends along an angle in the range of 360 to 460degrees relative to said central axis.

3. A device as set forth in claim 2, wherein:
   said control element includes a disk having said curved rotating controller surface formed therein in the shape of a spiral.

4. A device as set forth in claim 3, including:
   a slot with opposite flanks disposed through said disk and defining said curved rotating controller surface.

5. A device as set forth in claim 4, wherein:
   said shutter is shifted in a vertical direction between said raised and lowered positions.

6. A device as set forth in claim 5, wherein:
said shutter has a lower control edge disposed in a generally horizontal orientation.

7. A device as set forth in claim 6, wherein:
said shutter includes a suspension with an elongate vertical slot therein through which a pin is received to define at least a portion of said coupler member.

8. A device as set forth in claim 7, wherein:
said actuator comprises a linear actuator which shifts in a longitudinal direction between extended and retracted positions as a function of the liquid pressure in the chamber.

9. A device as set forth in claim 8, wherein:
said transmission member includes a reversing cable drive operably connected with said actuator.

10. A device as set forth in claim 9, including:
a counterweight operably connected with said shutter.

11. A device as set forth in claim 10, wherein:
said sensor includes a hydrostatic converter having a roller member.

12. A device as set forth in claim 11, wherein:
said hydrostatic converter includes a cylinder having a sealed piston mounted therein and a spring which acts opposite to the direction of said piston for shifting said shutter between said raised and lowered positions.

13. A device as set forth in claim 12, wherein:
said sensor includes an inlet opening disposed on the lower side thereof.

14. A device as set forth in claim 13, wherein:
said cylinder includes a chamber with an inlet opening defining an access for an external air line which communicates with compressed air.

15. A device as set forth in claim 14, wherein:
first and second of said devices are arranged respectively on head water and tail water sides of a bulkhead.

16. A device as set forth in claim 15, wherein:
said first and second devices are mounted on a common frame.

17. A device as set forth in claim 16, wherein:
said bulkhead is provided with an inlet opening and an outlet opening; and
said shutter is disposed between said inlet opening and said outlet opening.

18. A device for controlling fluid flow from a rain retention chamber, comprising:
an inlet configured to communicate with the chamber to permit fluid in the chamber to flow into said device;
an outlet configured to permit fluid from said inlet to flow out of said device;
a shutter disposed between said inlet and said outlet, and supported in said device for linear shifting between a raised position, and a lowered position;
a control element rotatably mounted in said device for rotation about a central axis, and including a curved controller surface which is non-concentric with said central axis of said control element, such that rotation of said control element about said central axis varies the radial distance between said central axis and said controller surface as measured along an associated radially extending reference line extending therebetween;
said curved controller surface extends along an angle in the range of 360 to 460 degrees relative to said central axis;
a coupler member operably connecting said shutter with said controller surface, such that rotation of said control element about said central axis shifts said shutter between said raised and lowered positions to achieve a predetermined flow rate of fluid from the chamber;
a sensor adapted to detect fluid level in the chamber, and including an actuator which shifts linearly as a function of the fluid level in the chamber; and
a transmission member operably connecting said actuator with said control element, whereby linear shifting of said actuator in response to fluid level fluctuations in the chamber rotates said control element about said central axis to selectively shift said shutter in a direction which achieves said predetermined flow rate.

19. A device as set forth in claim 1, wherein:
said control element includes a disk having said curved rotating controller surface formed therein in the shape of a spiral.

20. A device as set forth in claim 1, including:
a slot with opposite flanks disposed through said control element and defining said curved rotating controller surface.

21. A device as set forth in claim 1, wherein:
said shutter is shifted in a vertical direction between said raised and lowered positions.

22. A device as set forth in claim 1, wherein:
said shutter has a lower control edge disposed in a generally horizontal orientation.

23. A device as set forth in claim 1, wherein:
said shutter includes a suspension with an elongate vertical slot therein through which a pin is received to define at least a portion of said coupler member.

24. A device as set forth in claim 1, wherein:
said actuator comprises a linear actuator which shifts in a longitudinal direction between extended and retracted positions as a function of the liquid pressure in the chamber.

25. A device as set forth in claim 1, wherein:
said transmission member includes a reversing cable drive operably connected with said actuator.

26. A device as set forth in claim 1, including:
a counterweight operably connected with said shutter.

27. A device as set forth in claim 1, wherein:
said sensor includes a hydrostatic converter having a roller member.

28. A device as set forth in claim 27, wherein:
said hydrostatic converter includes a cylinder having a sealed piston mounted therein and a spring which acts opposite to the direction of said piston for shifting said shutter between said raised and lowered positions.

29. A device as set forth in claim 28, wherein:
said cylinder includes a chamber with an inlet opening defining an access for an external air line which communicates with compressed air.

30. A device as set forth in claim 1, wherein:
said sensor includes an inlet opening disposed on a lower side thereof.

31. A device as set forth in claim 1, wherein:
first and second of said devices are arranged respectively on head water and tail water sides of a bulkhead.

32. A device as set forth in claim 31, wherein:
said first and second devices are mounted on a common frame.

33. A device as set forth in claim 31, wherein:
said bulkhead is provided with an inlet opening and an outlet opening; and
said shutter is disposed between said inlet opening and said outlet opening.

* * * * *